Figure 1:
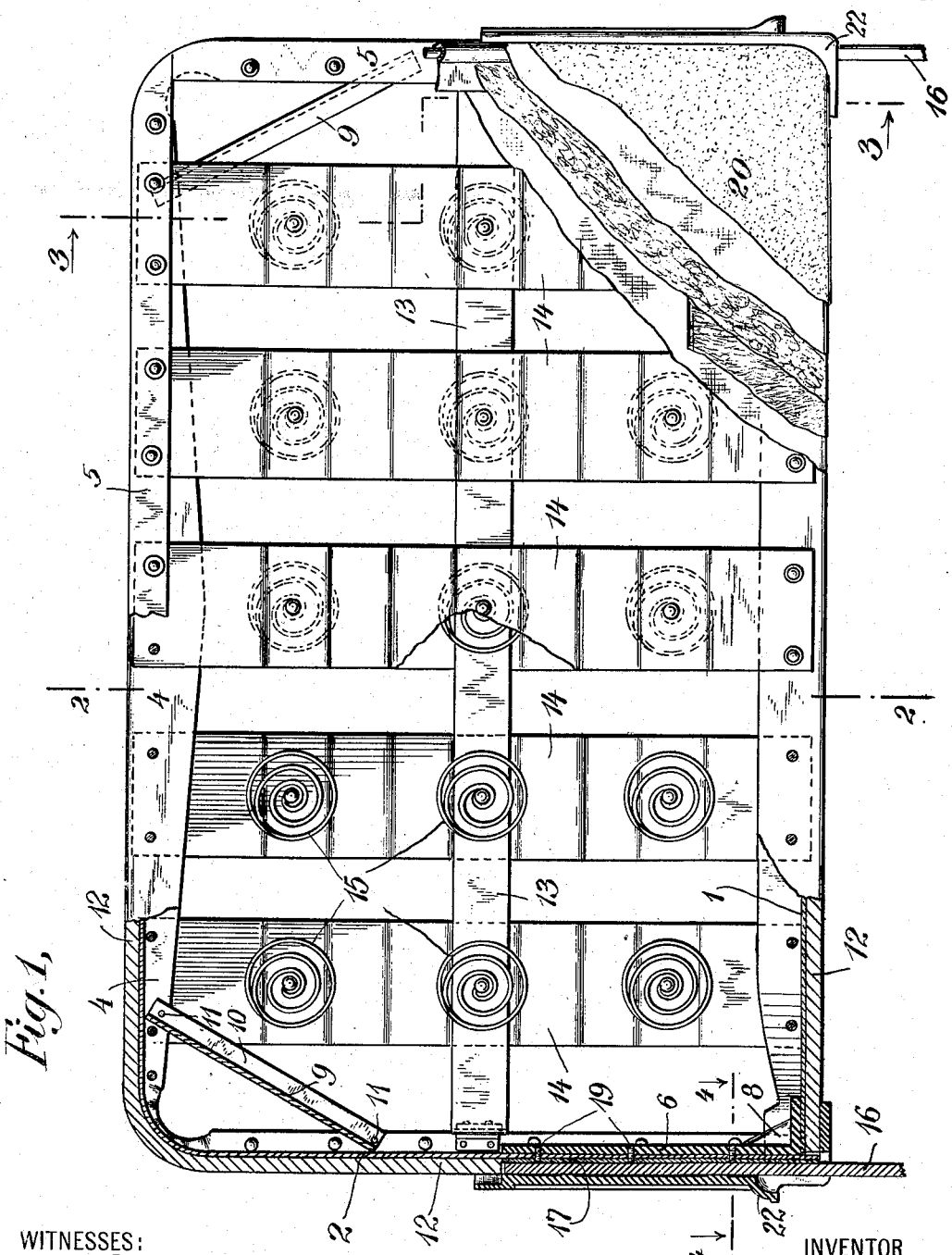

E. G. BUDD.
CUSHION.
APPLICATION FILED DEC. 21, 1907.

911,201.

Patented Feb. 2, 1909.

2 SHEETS—SHEET 1.

WITNESSES:

INVENTOR
Edward G. Budd
BY
J. C. Edmunds
ATTORNEY

E. G. BUDD.
CUSHION.
APPLICATION FILED DEC. 21, 1907.
911,201.
Patented Feb. 2, 1909.
2 SHEETS—SHEET 2.
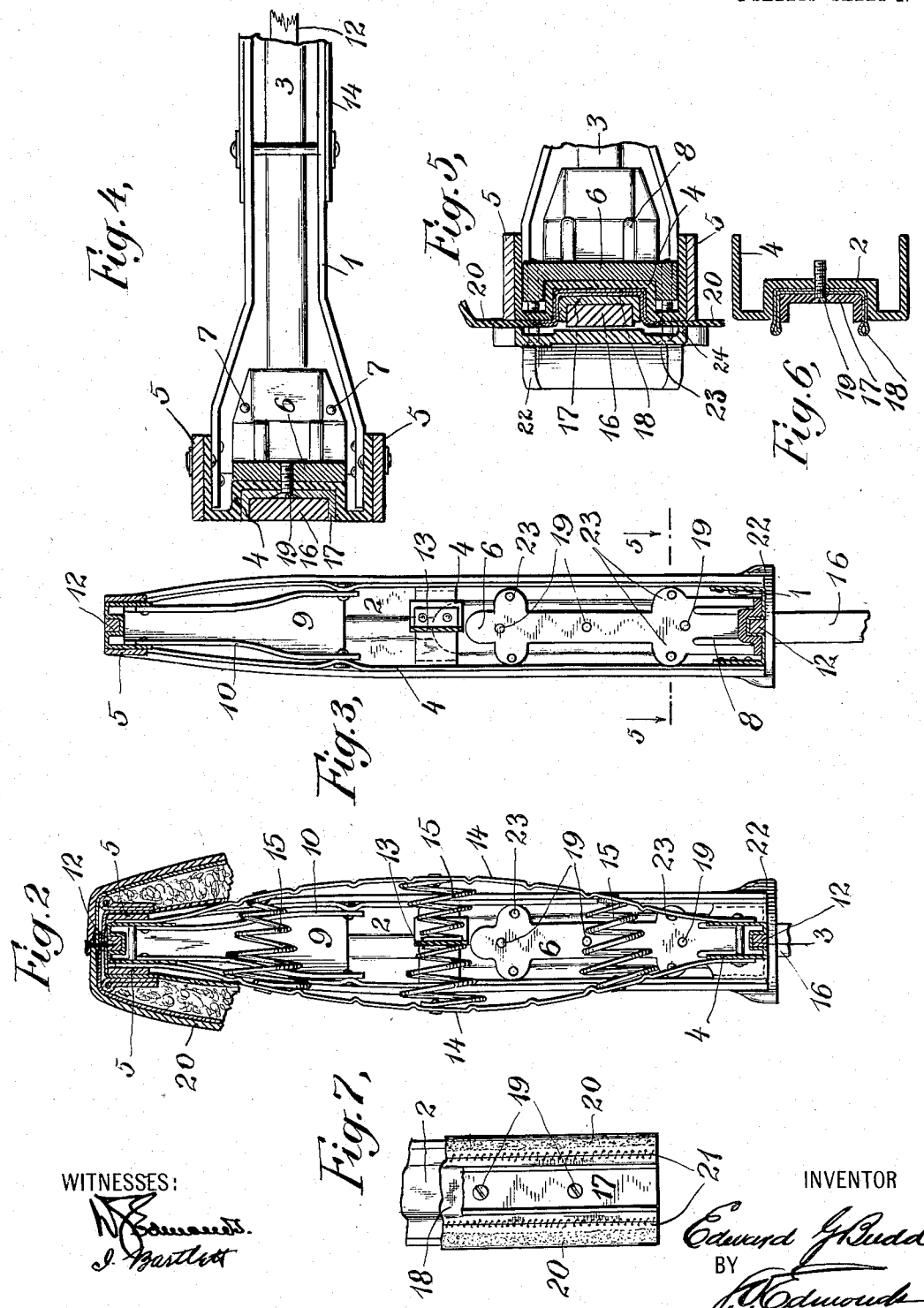
WITNESSES:
INVENTOR
Edward G. Budd
BY
ATTORNEY

UNITED STATES PATENT OFFICE.

EDWARD G. BUDD, OF PHILADELPHIA, PENNSYLVANIA, ASSIGNOR TO HALE-KILBURN METAL COMPANY, OF PHILADELPHIA, PENNSYLVANIA, A CORPORATION OF PENNSYLVANIA.

CUSHION.

No. 911,201.          Specification of Letters Patent.          Patented Feb. 2, 1909.

Application filed December 21, 1907. Serial No. 407,584.

*To all whom it may concern:*

Be it known that I, EDWARD G. BUDD, a citizen of the United States, residing in Philadelphia, in the county of Philadelphia and State of Pennsylvania, have invented certain new and useful Improvements in Cushions, of which the following is a specification.

This invention relates to cushions and has reference more particularly, to cushions adapted for use in car seats.

The invention is of special utility in a cushion adapted for use as a back for a car seat of the "Walkover" type. The invention is directed to the improvement of the construction of such cushions to the end that greater strength may be obtained and a cushion which may be manufactured at low cost produced.

A cushion constructed in accordance with the invention is provided with a metallic frame whereby the cushion is made practically fire-proof. Most of the parts of this frame are constructed of sheet-metal pressed to the desired form, as in this way low cost of construction is obtained. As the cushion is adapted particularly for use as a seat back, it is provided with members arranged to coact with the back-supporting levers with which car seats are ordinarily provided, and to be readily removable from these levers for purposes of cleaning and repair. The invention also includes improvements in the means for securing the covering material of the cushion to this frame, more particularly about the sockets on the cushion in which the back-supporting levers, above mentioned, are received, these improvements permitting securing the covering firmly to the frame about these sockets in such a manner that a considerable saving over the methods heretofore followed in the cost of manufacturing the cushions, is effected.

The preferred embodiment of the invention is illustrated in the accompanying drawings in which—

Figure 1 is a sectional elevation of the cushion, Fig. 2 is a transverse section broken away in part on line 2—2 of Fig. 1, Fig. 3 is a transverse section of the frame on line 3—3 of Fig. 1, Fig. 4 is a sectional detail view on line 4—4 of Fig. 1, the cover plate being removed, and Fig. 5 is a sectional view on line 5—5 of Fig. 3 showing the covering in place and Figs. 6 and 7 are detail views hereinafter referred to.

Referring to these drawings, the frame of the cushion is of rectangular form and consists of frame members of pressed sheet-metal secured together at their ends. Preferably, the frame consists of two such members, 1 and 2, the latter being bent to form three sides of the rectangular frame. Each of these frame members is pressed to provide a groove 3 on the outer side thereof and integral flanges 4 at the lateral edges turned inwardly of the frame. Certain of these flanges may be curved in the direction of their length, as shown in Figs. 2 and 3, so that the covering material of the cushion overlying these flanges is thereby given the curvature desired for the surface material of the cushion. If desired, thin strips of wood 5 may be fastened to these flanges 4 for convenience in securing the upholstery to the frame. In order to secure the two frame members 1 and 2 together, metallic corner pieces 6 are provided to which the ends of the frame members are secured in any suitable manner, as by rivets 7. These corner pieces are castings, each having two walls lying at right angles one to the other and a gusset 8 to contribute greater strength.

In order to reinforce the frame at the corners formed by the bends in the frame member 2, I provide braces 9 consisting of sheet-metal strips pressed to provide flanges 10 at the lateral edges thereof. These braces 9 are positioned across the corners of the frame, as shown in Fig. 1, and the flanges thereof are riveted to the flanges 4 on the frame members as shown at 11, Fig. 1. In the grooves 3 formed in the frame members are secured strips 12 of wood or other suitable material extending entirely around the cushion except at the lower portions of the opposite sides thereof, as best shown at the left of Fig. 1. A central metallic brace 13 extends lengthwise of the frame and is secured at its ends to the flanges 4 on the frame member 2. A plurality of flat metallic springs 14 extend across the frame at intervals, as shown in Fig. 1, and are riveted at their ends to the flanges on the frame members 1 and 2. A plurality of spiral springs 15 are provided for yieldingly sustaining these springs 14 one upon another and upon the central brace 13. The upholstery mate-